May 30, 1950 D. FULLER 2,509,601
AUTOMOBILE GLARE ELIMINATOR
Filed June 28, 1946
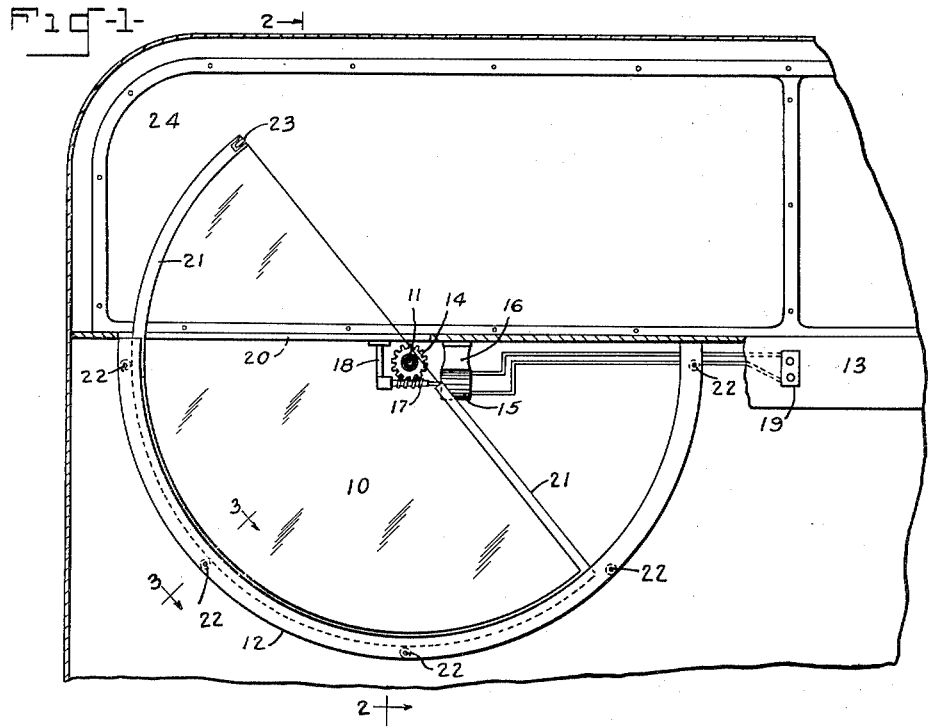
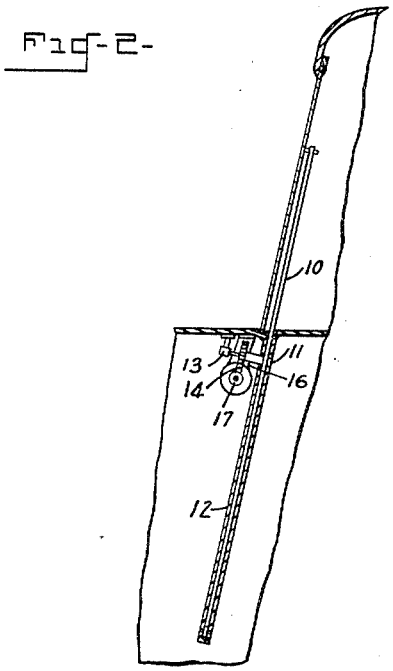
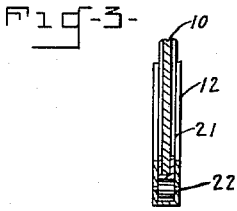
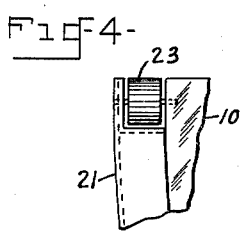
INVENTOR.
Don Fuller
BY
ATTORNEYS Patented May 30, 1950

2,509,601

UNITED STATES PATENT OFFICE 2,509,601

AUTOMOBILE GLARE ELIMINATOR

Don Fuller, Ogden, Utah

Application June 28, 1946, Serial No. 680,172

2 Claims. (Cl. 296—97)

My invention relates to protective devices for automobiles and more particularly to a device adapted to protect the eyes of a driver of an automobile against the glare of the head lights of an approaching automobile in night time or the reflected glare of the sun in day time.

The object of my invention is to provide a shield made of safety glass colored green and adapted to be installed in an automobile so that it can be moved to cover the windshield of the automobile either partly or entirely.

Other objects of my invention may appear in the following specification describing it with reference to the accompanying drawing illustrating a preferred embodiment thereof. It is however to be understood that my invention is not to be limited or restricted to the exact construction and combination of parts described in the specification and shown in the drawing but that such changes and modifications can be made which fall within the scope of the claims appended hereto.

In the drawing:

Figure 1 is a rear view elevation for a windshield of an automobile and the front of the body, the dashboard having been partly removed showing the installation of a glare protective shield according to my invention.

Figure 2 is a sectional view taken on line 2—2 in Figure 1.

Figure 3 is a sectional view taken on line 3—3 in Figure 1 and

Figure 4 is a detail view in a larger scale of a roller provided on one corner of the protective shield according to my invention.

Referring now in detail to the drawing the protective shield according to my invention consists of a semicircular section of green safety glass 10 having preferably a radius of 12 inches. In the center of the semicircular glass a shaft 11 is firmly embedded. A semicircular frame 12 is provided back of the dash board 13 of the automobile and is attached to the body thereof. The rear end of the shaft 11 extends through the shield 10 and is rotatably supported by the frame 12. A bracket 13 is fastened on the automobile body and supports the front end of the shaft 11 rotatably so that the glass shield is arranged parallel to the windshield. A worm gear 14 is rigidly mounted on the shaft 11 between the bracket 13 and the glass shield 10.

A small electric motor 15 is mounted on a bracket 16 which in turn is fastened to the automobile body. A worm 17 is rigidly mounted on the shaft of the motor 15 and meshes with the worm gear 14. The free end of the motor shaft is rotatably supported by a third bracket 18 attached to the automobile body.

The motor 15 is electrically connected with a two way switch 19 which is connected with the wiring of the automobile (not shown) so that the motor 15 can be rotated clockwise or counterclockwise.

A slot 20 is provided in the bottom of the windshield frame to permit the glass shield 10 to move therethrough.

The glass shield 10 is provided with a channel shaped frame 21 which is permanently fastened on the shield 10, surrounding the curved outline thereof and the lower half of the straight edge of the shield.

To facilitate the rotary movement of the shield 10 a plurality of small rollers 22 is rotatably mounted in the stationary frame 12 so that the circumferences of these rollers abut the semicircular edge of the shield frame 12. In addition to that, a roller 23 is rotatably arranged on the outside edge of the shield between the web of the channel shaped frame 21 and the shield 10. This roller engages the inside surface of the windshield 24, thereby facilitating the movement of the glass shield 10 over the windshield.

The driver can manipulate the switch 19 easily to adjust the protective glass shield in any desired position. It will suffice to raise the glass shield about 60 degrees to eliminate the glare of head lights of approaching automobiles in night time.

The position of the glass shield behind the dashboard protects it against dirt, dust and damage.

Having described my invention, I claim as new and desire to secure by Letters Patent:

1. In a motor vehicle having a dashboard, windshield and a device for shielding the eyes of an operator of said vehicle comprising a substantially semi-circular flat green glass shield having a pivot-shaft in the intermediate portion thereof and mounted for rotation into and out of superimposed relation with a predetermined area of the windshield, the features which include a semicircular frame secured to the body of the dashboard and depending from the windshield exteriorly of the area thereof for guiding the glass shield in movement out of the superimposed relation with said predetermined area of said windshield in a plane parallel to the latter, the windshield being free and clear of all portions of said semi-circular frame, and manually-operated drive means rotatable at right angles to said shaft for rotatably moving said glass shield.

2. In a motor vehicle having a dashboard, windshield, and a device for shielding the eyes of an operator of said vehicle comprising a substantially semi-circular flat green glass shield having a pivot-shaft in the intermediate portion thereof and mounted for rotation into and out of superimposed relation with a predetermined area of the windshield, the features which include a semi-circular frame secured to the body of the dashboard and depending from the windshield exteriorly of the area thereof for guiding the glass shield in movement out of the superimposed relation with said predetermined area of said windshield in a plane parallel to the latter, the windshield being free and clear of all portions of said semi-circular frame, worm gear means fixed on the shaft, and a manually-operated worm driving the worm gear means rotatable at right angles to said shaft for rotatably moving said glass shield at will.

DON FULLER.

REFERENCES CITED

The following references are of record in the file of this patent:

UNITED STATES PATENTS

| Number | Name | Date |
|---|---|---|
| 1,388,214 | Tate | Aug. 23, 1921 |
| 2,082,771 | Howard | June 1, 1937 |
| 2,107,247 | Johnson | Feb. 1, 1938 |
| 2,279,011 | Nicholson | Apr. 7, 1942 |

FOREIGN PATENTS

| Number | Country | Date |
|---|---|---|
| 285,750 | Great Britain | Feb. 23, 1928 |